United States Patent [19]

Berrett et al.

[11] 3,716,096
[45] Feb. 13, 1973

[54] TEMPERATURE CONTROL AND SUPERVISION SYSTEM FOR A BUILDING AIR CONDITIONING SYSTEM

[75] Inventors: James R. Berrett, Deerfield; Roger J. Feulner, Mt. Prosepct, both of Ill.

[73] Assignee: Honeywell, Inc., Minneapolis, Minn.

[22] Filed: Sept. 7, 1971

[21] Appl. No.: 178,095

Related U.S. Application Data

[63] Continuation of Ser. No. 864,679, Oct. 8, 1969, abandoned.

[52] U.S. Cl. .......................165/22, 62/140, 62/180, 62/216, 62/411, 235/151.1, 340/163
[51] Int. Cl. ..................................................F24f 3/00
[58] Field of Search........62/140, 177, 180, 216, 411, 62/412; 340/146.1, 163; 235/151.1; 165/22

[56] References Cited

UNITED STATES PATENTS

| | | | |
|---|---|---|---|
| 3,398,889 | 8/1968 | Bohannan | 236/1 |
| 3,400,374 | 9/1968 | Shumann | 340/172.5 |
| 3,408,626 | 10/1968 | Gabrielson | 340/163 |
| 3,427,818 | 2/1969 | Erickson | 62/140 |
| 3,439,329 | 4/1969 | Betz et al. | 340/146.1 |

OTHER PUBLICATIONS

Honeywell Automation Publication, Oct, 1967.

*Primary Examiner*—Meyer Perlin
*Assistant Examiner*—Ronald C. Capossela
*Attorney*—Lamont B. Koontz

[57] ABSTRACT

A temperature control and supervision system for controlling and supervising the operation of a building air conditioning system having a central station and a plurality of remote stations connected by a single communication channel, wherein the control and supervision is accomplished by message transmitting and receiving apparatus at the central station and each of the remote stations for generating and interrogating serially coded messages comprising a plurality of bits in binary form.

2 Claims, 6 Drawing Figures

INVENTOR.
JAMES R. BERRETT
ROGER J. FEULNER
BY
Clyde C. Blinn
ATTORNEY.

PATENTED FEB 13 1973    3,716,096

CENTRAL TO STATION 1

| 0 | 0 | 0 | 0 | 0 | 0 | 0 | 0 | 1 | 1 | 1 | 0 |

60 — STATION ADDRESS    61 — MOTOR START

FIG. 3

STATION 2 TO CENTRAL

| 0 | 1 | 1 | 1 | 0 | 0 | 1 | 0 | 0 | 0 | 0 | 0 |

TENS    UNITS    TENTHS

FIG. 4

CENTRAL TO STATION 3

| 0 | 0 | 0 | 0 | 0 | 0 | 0 | 1 | 0 | 0 | 1 | 0 |

62 — STATION ADDRESS    63 — PUMP ON

FIG. 5

STATION 4 TO CENTRAL

| 0 | 0 | 0 | 0 | 0 | 0 | 0 | 0 | 0 | 0 | 0 | 0 |

64 — DIGITAL INPUT    65 — OPEN SWITCH

FIG. 6

STATION 5 TO CENTRAL

| 0 | 1 | 1 | 1 | 1 | 0 | 0 | 0 | 0 | 0 | 0 | 0 |

TENS    UNITS    TENTHS

INVENTOR.
JAMES R. BERRETT
ROGER J. FEULNER
BY
Clyde L. Blinn

TEMPERATURE CONTROL AND SUPERVISION SYSTEM FOR A BUILDING AIR CONDITIONING SYSTEM

This application is a continuation of Ser. No. 864,679, filed Oct. 8, 1969, now abandoned.

BACKGROUND OF THE INVENTION

In a temperature control and supervision system for controlling and supervising the operation of an air conditioning system in large buildings, a central station or control panel is connected to control a plurality of remote station apparatus. The communication network or connections between the central station and the remote apparatus have been accomplished by the use of individual circuits or multiplexed circuits, however, in prior art systems, the cost of installation of the communication network between the central and remote stations has been an expensive item in the overall cost of such temperature control and supervision systems.

As the cost of installation of multi-communication channels such as individual wiring between the central station and the plurality of remote stations increases, there has been an attempt to decrease such initial installation cost by reducing the number of wires between the central station and the remote apparatus.

SUMMARY OF THE INVENTION

The present invention is concerned with the connection of a central station or panel to a plurality of groups of remote stations or apparatus in an air conditioning control and supervision system by use of a single communication channel or coaxial cable. With the use of transmitting and receiving apparatus at the central station and remote stations to transmit and receive serially coded messages comprising a plurality of bits in binary form, the various apparatus in the building air conditioning system can be remotely controlled and remotely supervised from the central station. With this invention, the initial cost of installation is greatly reduced and even though the cost of terminal equipment at the central station and remote stations may be somewhat greater, the overall economics, as well as overall operation, of the system is greatly improved.

The present invention is disclosed in the drawing of which:

FIGS. 2, 3, 4, 5 and 6 are typical message formats used for the serially coded messages comprising a plurality of bits in binary form for accomplishing the various control and supervision operations of the system shown in FIG. 1.

DESCRIPTION OF THE INVENTION

Figure 1:
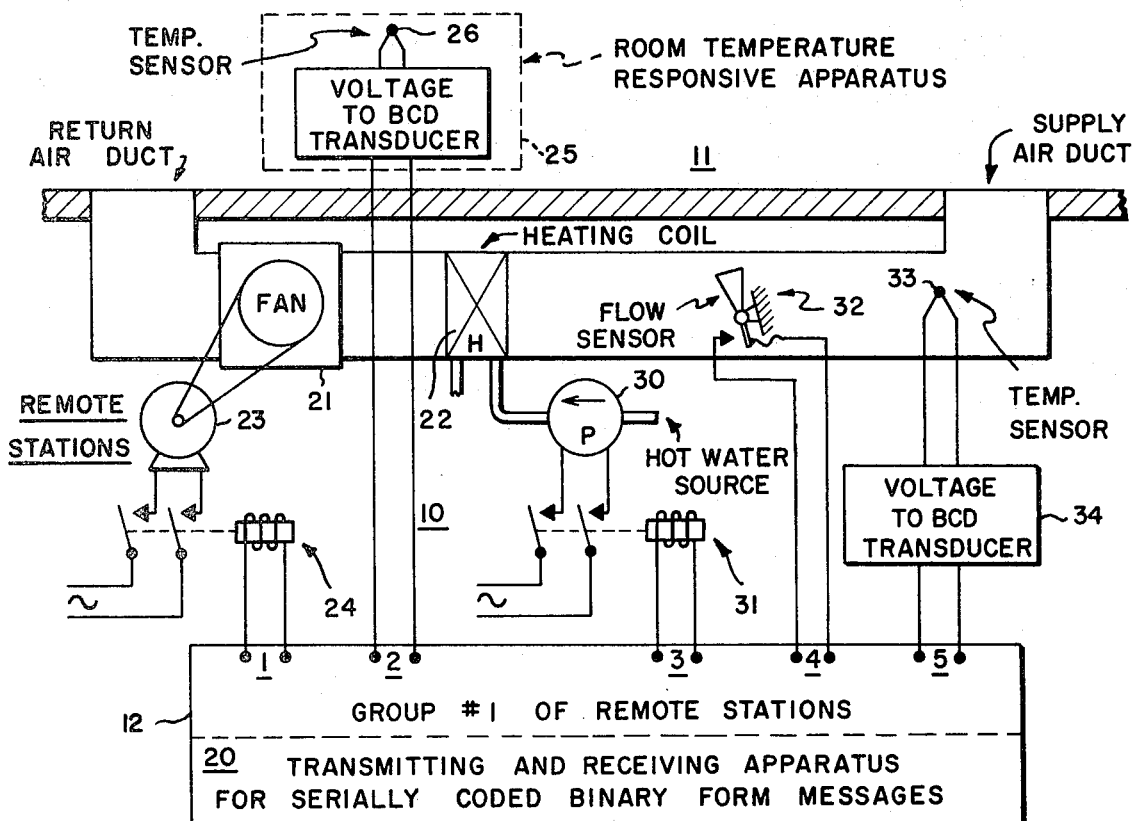
FIG. 1 is a schematic representation of a central station and a plurality of remote stations containing apparatus for controlling and supervising a building air conditioning system.
Figure 1:
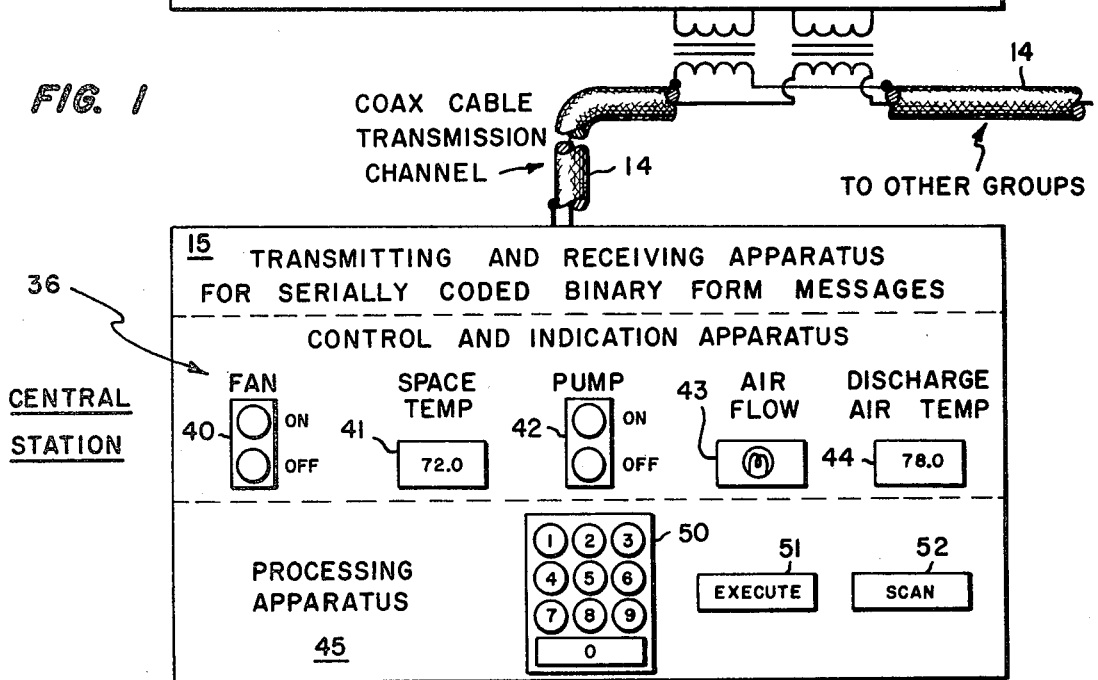

Referring to FIG. 1, an air conditioning system 10 for a building is shown for supplying conditioned air to one space 11 of the building. Various apparatus for control and supervision of the air conditioning system forms group No. 1 of a plurality of remote stations by connecting the apparatus to a panel 12. Only group No. 1 and its panel 12 are shown, however, each of the other groups, not shown, has a similar plurality of apparatus and a panel.

A central station has a console or panel 13 which is series connected by a single transmission channel or coaxial cable 14 to panel 12 and to other similar panels 12 (not shown) associated with the other groups of remote stations. While the apparatus of the remote stations connected to panel 12 and forming group No. 1 provide certain control and supervision functions, the control and supervision function in the building air conditioning system and the particular apparatus shown in the remote stations of group No. 1 has been selected as representative for explanation purposes.

Central station panel 13 has a message transmitting and receiving apparatus 15 for sending and receiving serially coded messages comprising a plurality of bits in binary form. A similar message transmitting and receiving apparatus 20 in panel 12 associated with the plurality of remote stations of group No. 1 transmits and receives serially coded messages comprising a plurality of bits in binary form.

Specifically, the communication system between the central station and the groups of remote stations by linking the central station panel 13 with panel 12, as well as panels associated with other groups but not shown, is old in other types of systems having central and remote stations. Such communication systems connecting a central station and a plurality of remote stations are shown in the Gabrielson U.S. Pat. No. 3,408,626, in the Betz et al. U.S. Pat. No. 3,439,329, in an Automatic Electric Laboratories, Inc. publication (National Telemetering Conference–66–Paper No. BA–4.4 of May 11,1966) entitled "A New Data-Gathering and Control System" by R.P. Sanders, and in an Instruments Society of America publication (Reprint Number 25–1–ACOS–67) entitled "A Computer Oriented Supervisory Control System as Applied to a Large Products Pipeline" by Richard T. Atwood, N.D.Rathbun and R.M. Jacques. In such prior art communication systems, a central station is connected to a plurality of remote stations over a communication channel for sending messages to and from the central station and remote stations in a serially coded form comprising a plurality of bits in binary form. In the present invention, temperature control and supervision of a building air conditioning system is accomplished by a serially coded message sent over a single channel transmission circuit or cable. During the installation of the control and supervision system, the central station is connected to the plurality of panels 12 and thus the remote stations by means of the single coaxial cable 14 which results in a low cost installation.

Referring to the system 10, a fan 21 circulates air from a space 11 through a return and supply duct including a heating coil 22. Fan 21 is driven by a motor 23 which is controlled by a relay 24 connected as remote station 1 to panel 12. The space 11 contains a room temperature responsive apparatus 25 comprising a temperature sensor or thermocouple 26 connected to a voltage to binary code decimal transducer which is connected to panel 12 as station 2. A pump 30 is connected to deliver hot water from a source to coil 22 when a relay 31 is energized. The relay is connected to panel 12 as remote station 3. A flow sensor or sail switch 32 is responsive to air flow through the air duct to close a switch connected to station 4 when a predetermined air flow exists. The temperature of the air being supplied to space 11 from the supply air duct is measured by a thermocouple or temperature sensor 33 connected to a voltage to binary code decimal transducer 34 associated with station 5 of panel 12.

The central station panel 13 has conventional control and indicating apparatus 36 associated with the control and supervision apparatus of the remote stations of group No. 1 as well as the other groups. A fan stop-start switch 40 is used for controlling the operation of relay 24 of remote station 1, a digital read-out space temperature indicator 41 is associated with the temperature responsive apparatus 24 of remote station 2, a pump control switch 42 is for controlling the pump relay 31 associated with station 3, an indicator light 43 is associated with the flow sensor of station 4, and a digital read-out temperature indicator 44 indicates the discharge air temperature of temperature sensor 33 associated with remote station 5.

The central station panel 13 has processing apparatus 45 of a conventional type for accomplishing the control and supervision of the control and indicating apparatus by sending serially coded messages in binary form, utilizing message transmitting and receiving apparatus 15, over the single series communication channel to the various panels such as panel 12 of group No. 1 to accomplish the control and supervision of building air conditioning system 10. Processing apparatus 45 comprises a digital input push button panel 50 for selecting various control and supervision functions and for executing control commands with the execute button 51 or supervising apparatus with a scanning operation accomplished by a scan button 52. Processing apparatus 45 translates the various inputs into messages which are serially transmitted over the single communication channel 14 to the remote panels 12.

For explanation purposes, typical message formats for various operations associated with the building air conditioning system 10 and the specific apparatus shown with remote stations 1 to 5 of group No. 1 are shown in FIGS. 2 to 6. FIG. 2 is a 12 bit message which is transmitted from the central station to the remote groups and by means of the station address made up of 6 bits, station 1 of group No. 1 is selected and by means of a specific bit 61, a motor start operation is accomplished by the energization of relay 24, shown in FIG. 1. Specifically, the operation is accomplished by addressing the station by the push button input 50 of processing apparatus 45 of central station panel 13 and executing a fan on operation with the fan switch 40 when execute button 51 is operated. The message transmitting apparatus 15 sends out the serially coded message of FIG. 2 to be received by the message receiving apparatus 20 of panel 12.

When the central station is in a scan operation as accomplished by button 52, various functions associated with the remote stations of panel 2 are reported at the central station. By means of an input from panel 12 to the central station, as shown in FIG. 3, a 12 bit word made up of three groups of 4 bits to provide a digital output from the temperature responsive apparatus 25 which would be identified and interpreted as the space temperature 72° F at indicator 41.

The energization of pump 30 is accomplished by the operation of push button input 50 of processing apparatus 45 to address the station 3 of group No. 1 by a station address such as shown at 62 in FIG. 4 with a single bit 63 used to energize relay 31 to turn the pump on.

The scanning operation accomplished by the operation of the scan button 52 of the central station supervises the flow of air at remote station 4 to report the condition of the flow sensor switch by a message such as shown in FIG. 5 in which bit 64 indicates a digital input and bit 65 is used to energize light 43 to indicate the condition of the switch as being open.

A similar temperature indication of the air supply temperature from thermocouple 33 is reported to the digital indicator 44 of the central station during a scan operation by an input message as shown in FIG. 6 having three portions for reporting the temperature as 78° F at the discharge of the air conditioning system 10.

OPERATION OF THE INVENTION

With a central station or panel 13 located in a building and connected by means of a single transmission channel or coaxial cable 14 to a plurality of panels such as 12 representing groups of remote stations, serially coded messages comprising a plurality of bits in binary form are transmitted from the central station to the remote groups of remote stations and from the groups of remote stations to the central panel to accomplish the various control and supervision operations of the building air conditioning control and supervision system. The single communication channel is connected in a series manner between the various panels such as 12 associated with a plurality of groups of remote stations. From the central station, the operator can control and supervise the building air conditioning system by either sending serially coded messages over the single transmission channel to selectively control various functions of the remote stations or receive from the remote stations information to supervise the condition of the building air conditioning system at the central station.

The embodiments of the invention in which an exclusive property or right is claimed are defined as follows:

1. In a temperature control and supervision system for controlling and supervising the operation of building air conditioning system wherein the physical location of the apparatus of the system is separated such great distances that the use of individual channels of communication between each of the various apparatus to accomplish indication and control would be complex and expensive comprising:
   a central station comprising;
       air conditioning temperature indicating apparatus for use by an operator to observe the temperature of selected apparatus of a building air conditioning system,
       air conditioning control apparatus to control selected apparatus of said building air conditioning system,
       message transmitting and receiving apparatus to transmit and receive serially coded messages comprising a plurality of bits in binary form for a binary code decimal message format, and
       means connecting said air conditioning temperature indicating apparatus and said air conditioning control apparatus to said message transmitting and receiving apparatus including means for receiving messages in binary code decimal format for providing output signals indicative of temperatures for said air conditioning temperature indicating apparatus and including means for sending messages in binary code decimal format upon receiving signals from said air conditioning control apparatus for controlling remote apparatus of said air conditioning system, a plurality of groups of remote stations each comprising;

second message transmitting and receiving apparatus to transmit and to receive serially coded messages comprising a plurality of bits in binary form for a binary code decimal message format, air conditioning temperature sensing means for sensing the temperature of apparatus of said air conditioning system to provide an output signal indicative of the temperature, air conditioning control means for controlling apparatus of said air conditioning system upon receiving control signals indicative of the change to be accomplished, and means connecting said temperature sensing means and said control means to said second message transmitting and receiving apparatus including means for providing messages in binary code decimal format indicative of temperature upon receiving said output signal of said air conditioning temperature sensing means, and including means upon receiving messages in binary code decimal format indicative of a change to be accomplished for providing control signals to said air conditioning control means, and a single channel transmission means series connecting said message transmitting and receiving apparatus of said central station to each of said second message transmitting and receiving apparatus of said plurality of groups of remote stations whereby serially coded messages having a plurality of bits for a binary code decimal format are sent to and from said central station and said groups of remote stations so that the temperature of said temperature sensing means at any one of said plurality of remote stations can be indicated at said temperature indicating apparatus of said central station and said control means at one of said plurality of remote stations can be controlled by said control apparatus of said central station.

2. The invention of claim 1 wherein, said remote stations are located throughout a building, said stations include a fan motor control means, a water pump control means, an air flow sensing means, and a temperature sensing means, and said transmission means comprises a coaxial cable to provide said single channel connection to be used throughout the building from said central station whereby a fan motor is adapted to be controlled through said fan motor control means, a water pump is adapted to be controlled through said water pump control means, the flow of air is adapted to be controlled through said water pump control means, the flow of air is adapted to be indicated by said air flow sensing means and the temperature of the air is adapted to be indicated by said temperature sensing means.

* * * * *